INVENTOR.
Milton H. Mater
BY
Buckhorn, Cheatham & Blore
ATTORNEYS

INVENTOR.
Milton H. Mater
BY
Buckhorn, Cheatham & Blore
ATTORNEYS

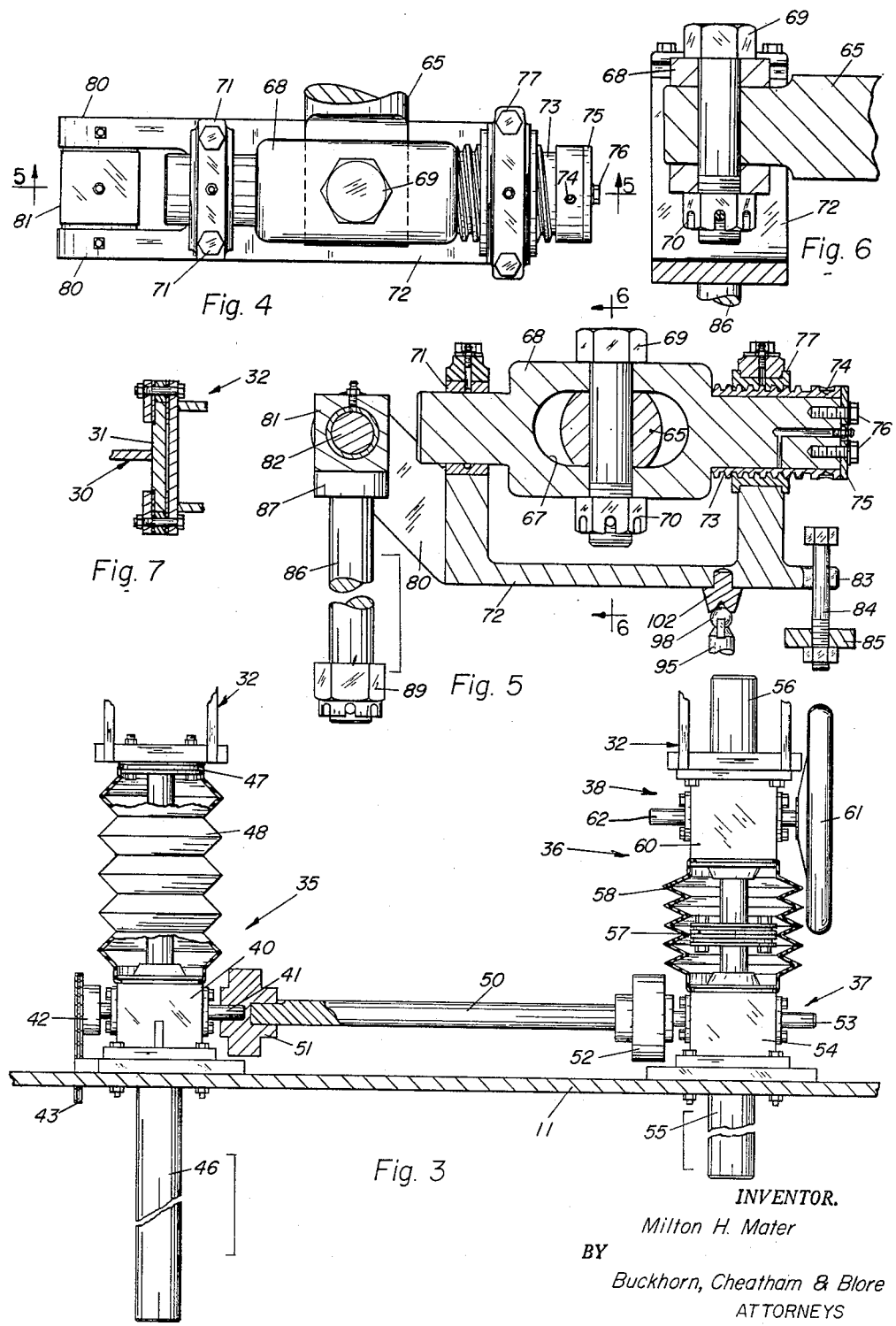

Nov. 24, 1964
M. H. MATER
3,158,184
BAND MILL WITH TILT ADJUSTING MEANS
AND CROSS-LINE ADJUSTING MEANS
Filed May 2, 1960
4 Sheets-Sheet 4
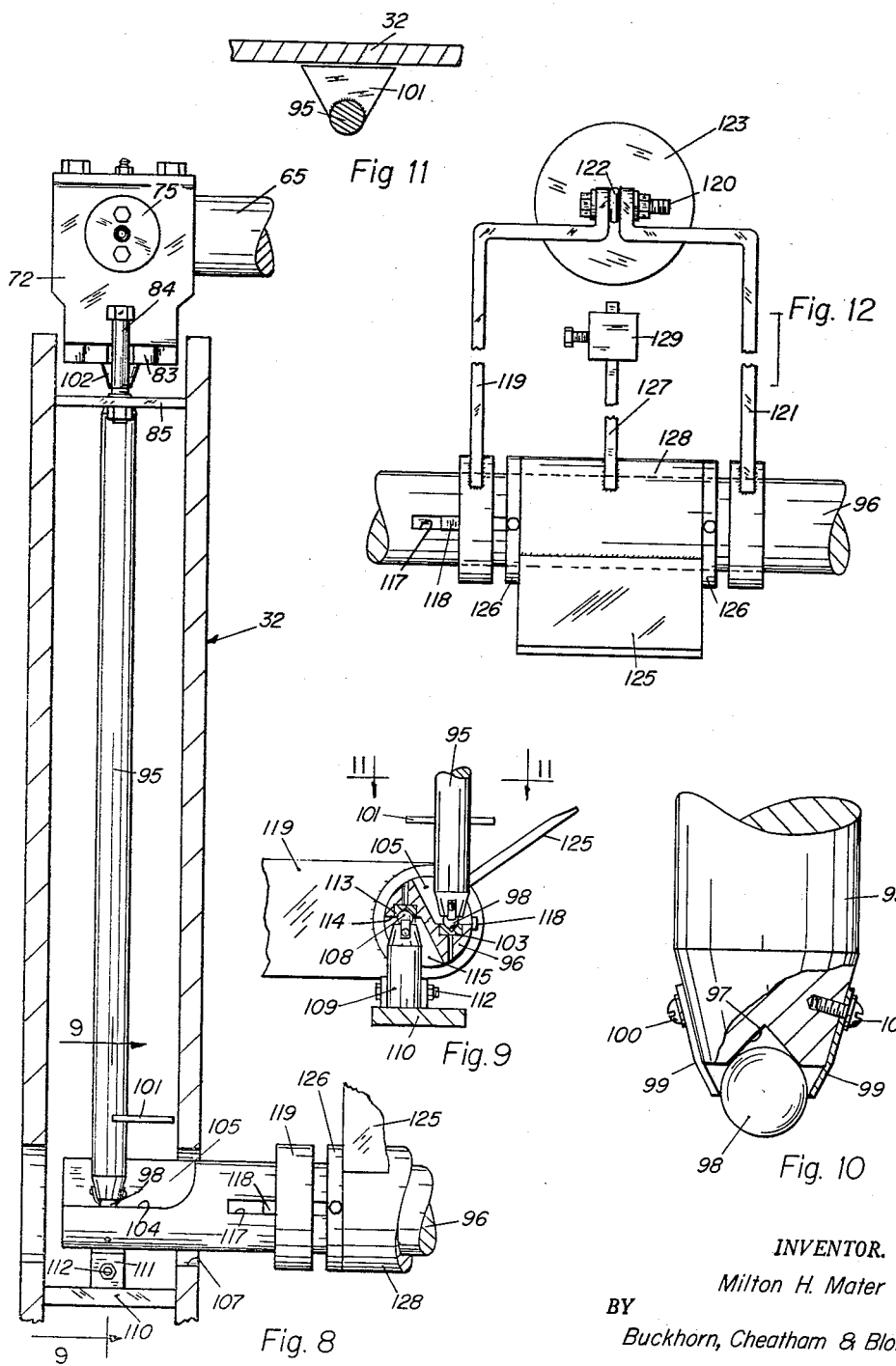
INVENTOR.
Milton H. Mater
BY
Buckhorn, Cheatham & Blore
ATTORNEYS

United States Patent Office 3,158,184
Patented Nov. 24, 1964

3,158,184
BAND MILL WITH TILT ADJUSTING MEANS AND CROSS-LINE ADJUSTING MEANS
Milton H. Mater, Corvallis, Oreg., assignor to Appleton Machine Company, Appleton, Wis., a corporation of Wisconsin
Filed May 2, 1960, Ser. No. 26,007
7 Claims. (Cl. 143—27)

The present invention comprises an improved band mill, particularly of larger sizes such as a mill comprising a band saw fifty feet in circumference and ten inches in width. The dimensions given are those of commonly employed band mills and the present invention may comprise a mill utilizing much smaller or much larger band saws.

In band mills of this character it is common to employ tilt adjustment means for angularly shifting the axis of the upper band wheel in a vertical plane so as to compensate for the greater stretching of the saw tooth edge of the band saw during use, such stretching being due to greater frictional heating of the band saw along its toothed edge, and the amount thereof usually varying while the band mill is in use. It is also common to provide band mills with crossline adjustment means whereby the axis of the upper band wheel may be angularly shifted in a horizontal plane in order to achieve parallel cuts. Such an adjustment is called a crossline adjustment and is usually set by a skilled saw filer when he initially mounts a newly sharpened band saw on the mill. It is also common to employ strain rods, comprising a pair of rods extending vertically, one at each side of the upper band wheel, which rods are constantly urged upwardly by spring means, or counterbalance means, or a combination of the two, the rods thrusting upwardly against movable bearing supports for the axle of the upper band wheel, for the purpose of preventing breakage of the band saw as the teeth initially encounter the end of a log or encounter knots or other dense portions of a log in the middle of a cut.

In band mills of the prior art incorporating the devices mentioned above, there is an interaction between any two or all three of the devices mentioned. That is to say, when the angle of tilt is adjusted the adjustment affects the crossline positioning of the blade so that readjustment of the crossline angle is required, or vice versa. Or, if either one or both of the crossline and tilt adjusting means are adjusted, there is an adverse and dangerous effect upon the strain rod assembly. The latter effect is occasioned because the connection between a strain rod and the axle supporting assembly or between a strain rod and the means for exerting upward force against the strain rod has, in all such prior art devices, been effected through a knife blade mechanism. When an adjustment in tilt or crossline is made, the knife edges of the strain rods are tilted with respect to the saddles in which they are engaged, resulting in breakage or mashing of the corners of the knife edges. When this happens the strain rod assemblies lose sensitivity and do not respond to variations in feed of the log to the saw. This in turn slows production, or permits the sawyer to push the saw off the wheels, an expensive if not fatally dangerous matter. When it is realized that tilt adjustment is frequently accomplished during daily use of the mill, it will be appreciated that the danger is real and constantly present.

The principal object of the present invention is to provide a band saw with adjustable tilt means, adjustable crossline means, and strain relief means wherein adjustment of either the angle of tilt or the crossline angle has no effect upon the other of the two named angles, and adjustment of either or both of the two named angles has no effect upon the strain rod assembly. As a result of the present invention the saw filer's job is made much easier since he may mount a sharpened band saw by adjusting the crossline adjustment means and the tilt adjustment means independently of each other without going back and forth from the one to the other to re-adjust for the effect of one upon the other. As a further result of the present invention, the sawyer's job is made much safer since he may at any time readjust the angle of tilt without danger of snapping the band saw.

A further object of the present invention is to provide improved angle of tilt adjustment means for a band mill.

A further object of the present invention is to provide improved crossline adjustment means for a band mill.

A further object of the present invention is to provide an improved strain rod assembly for a band mill.

The objects and advantages of the present invention will be more readily understood by reference to the accompanying drawings taken in connection with the following specification wherein like numerals refer to like parts throughout.

In the drawings,

FIG. 3 is a partial section taken substantially along line 3—3 of FIG. 2, on an enlarged scale, and with parts broken away for clarity;

FIG. 4 is a partial view looking downward from the plane of the line 4—4 of FIG. 2, taken on an enlarged scale;

FIG. 5 is a vertical section taken substantially along line 5—5 of FIG. 4;

FIG. 6 is a vertical section taken substantially along line 6—6 of FIG. 5;

FIG. 7 is a vertical section taken substantially along line 7—7 of FIG. 2;

FIG. 8 is a partial vertical section taken substantially along line 8—8 of FIG. 2, on an enlarged scale;

FIG. 9 is a partial vertical section taken substantially along line 9—9 of FIG. 8;

FIG. 10 is a partial detail of a portion of the apparatus shown in FIG. 9, on a greatly enlarged scale, with parts broken away for clarity;

FIG. 11 is a partial section looking down from the plane of the line 11—11 of FIG. 9; and FIG. 12 is a partial horizontal section looking down from the line 12—12 of FIG. 1, on an enlarged scale.

Figure 1:
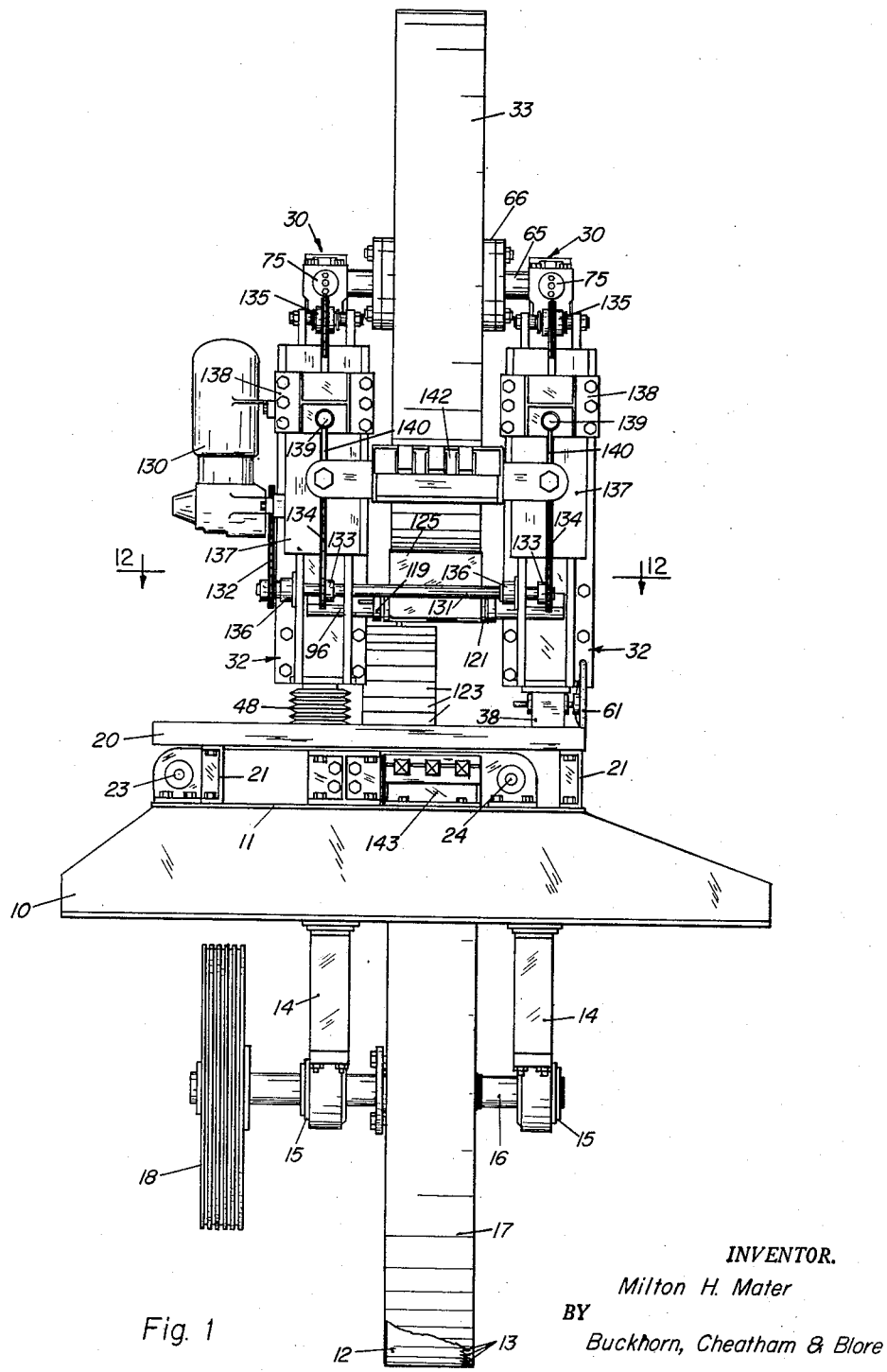
FIG. 1 is a front elevation of a band mill constructed in accordance with the present invention, with parts broken away for clarity.
Figure 2:
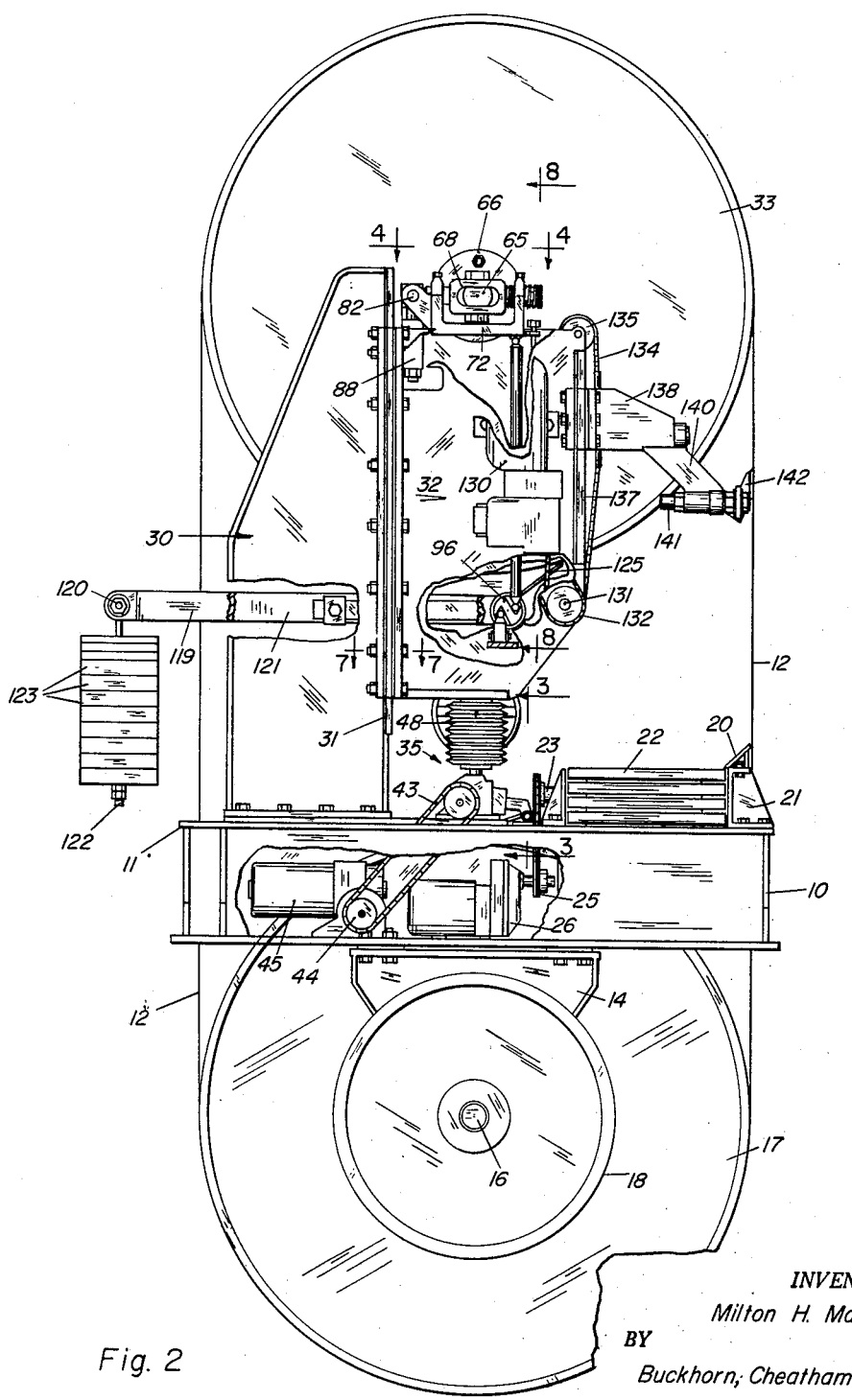
FIG. 2 is a side elevation of the band mill of FIG. 1 taken from the off-bear side of the mill, with parts broken away for clarity.

The invention comprises a base 10, preferably formed of structural members welded together, the base extending laterally outward on each side to rest upon suitable foundations (not shown). The base includes an upper plate 11 lying in a substantially horizontal plane and which is suitably recessed or apertured (not shown) to permit passage of the vertical flights of the band saw 12. The band saw is provided with teeth, indicated at 13, usually on the sawyer's side of the mill alone, or the saw may have teeth on both sides in a double-cut bandmill where the log is cut while going either way. A pair of lower band wheel supports 14 depend from the base and terminate in bearing means 15 which journal the axle 16 of the lower band wheel 17. The lower band wheel is fixed to the axle 16 and is driven by a pulley 18 also fixed to the axle 16, the pulley in turn being driven by belt means (not shown) extending to a motor (not shown). The lower band wheel 17 is a driven wheel and is suspended beneath the base with its axis of rotation in fixed relation thereto, the axis of rotation being substantially horizontal and parallel to the line of cut which will be made by the band saw 12 when a log or the like is moved horizontally past the bandmill in the usual fashion, the direction of movement being from right to left in FIG. 1, or from the sawyer's side of the band mill toward the off-bear side, or in either direction in a double-cut mill.

Slabs or boards cut from the member being sawn fall edgewise onto a shunt 20 suitably mounted on brackets 21 fixed to the front edge of the base, being thereby caused to fall flatly onto an off-bear conveyer 22. That is, the rear end of a long slab or board will fall onto the off-bear conveyer 22. Other aligned conveyer means (not shown) support the forward portions of the slab or board, the two conveyers rapidly removing the same so as to clear the saw for a succeeding cut. The conveyer 22 is trained about a driven pulley (not shown) fixed to a driven axle 23 at one end and a second pulley (not shown) fixed to an idler axle 24 at its other end. Chain and sprocket means 25 connect the driven axle 23 to a reduction gear motor 26 which is constantly driven while the band mill is in operation. The axles 23 and 24 are suitably supported in brackets fixed to the upper plate 11 and the motor 26 is suitably supported within the body of the base 10.

A laterally spaced pair of upper band wheel supports 30 are mounted upon the base at the rear thereof, one at each side of the band saw. Each support 30 comprises a forward T-shaped guide portion 31 which extends vertically and which slidably guides a frame 32 for vertical movement thereon toward and away from the base. The frame is adjustably moved up and down along the support by jack means, to be described, the jack means comprising means whereby both of the frames 32 may be moved coextensively and simultaneously, and whereby one frame, the frame on the sawyer's side, may be further adjusted independently of the frame on the off-bear side. The frames 32 mount the upper band wheel 33, as will presently appear.

The jack means comprises an off-bear jack 35 and a sawyer's jack assembly 36, the latter comprising a lower sawyer's jack 37 and an upper sawyer's jack 38. The off-bear jack comprises a worm and gear mechanism 40 driven by a shaft 41 to which is fixed a sprocket 42, sprocket chain 43 and sprocket gear 44 driven by a reduction gear motor 45 suitably mounted in the base 10. The worm and gear mechanism raises and lowers a jack stem 46 extending through an opening in the plate 11, the reduced upper end of which is fixed to the bottom of the off-bear frame 32 through a thrust bearing device 47. An accordian sleeve 48 surrounding the upper end of the jack stem protects the jack from becoming clogged with sawdust.

The shaft 41 is connected to a transverse shaft 50 through a connector 51, the other end of shaft 50 being connected by a connector 52 to the shaft 53 of the lower jack 37 of the sawyer's jack assembly. The shaft 53 drives a worm and gear mechanism 54 to raise and lower a lower jack stem 55, the reduced end of which extends upwardly and is connected to the jack stem 56 of the upper sawyer's jack 38 through a flexible connector 57 which is surrounded by an accordian sleeve 58 extending between the two jacks. The upper jack stem 56 is adapted to be raised and lowered by a worm and gear assembly 60 which is operated by a sawyer's adjusting hand wheel 61 fixed to the upper jack driving shaft 62. In the manner of worm and gear devices, the jack stem 56 is locked in position vertically with respect to the worm and gear device unless the hand wheel is turned. The upper jack 38 is fixed to the sawyer's frame 32 and the stem 56 thereof extends through an opening in the bottom of the frame.

When the motor 45 is energized in one direction, the frames 32 are simultaneously raised to the same extent through the action of the jacks 35 and 37, and are simultaneously, coextensively lowered thereby when the motor 45 is actuated in the reverse direction. Manual rotation of the sawyer's hand wheel 61, however, causes the worm and gear assembly 60 and the sawyer's frame 32 to which it is affixed, to be raised or lowered independently of the off-bear frame 32. Since the axle of the upper band wheel 33 is supported at its ends respectively on the frames 32, it can be seen that the motor 45 may be employed rapidly to lower the band wheel to permit removal of a band saw for sharpening, and rapidly to raise the upper band wheel to tighten the band saw after it has been sharpened and replaced. It can also be seen that actuation of the hand wheel 61 by the sawyer during operation of the band mill can be the cause of raising the sawyer's frame 32 independently of the off-bear frame 32 whereby to tilt the axis of the upper band saw wheel 33 to compensate for lengthening of the toothed edge of the band saw during use.

The upper band saw wheel axle 65 is rotatively fixed in its supports and the upper band wheel 33 is journaled thereon by means of a suitable hub 66, there being cooperating portions (not shown) on the axle 65 and hub 66 to prevent axial shifting of the wheel 33 along the axle 65. It is to be appreciated that the upper band wheel 33 is an idler wheel and is driven solely by frictional engagement of the band saw 12 therewith. Each end of the axle 65 is flattened at top and bottom and engaged in an elongated slot 67 in a yoke member 68 which may be shifted in a manner to angularly shift the axle 65 in a horizontal plane so as to change the crossline angle of the saw. Each of the yokes 68 may be so adjusted in order that the saw filer may position the axis of the upper wheel in substantially a vertical plane through the axis of the lower wheel. Depending upon the requirements of the particular mill, band saw, or other factors such as the desires of the saw filer, the upper wheel may be adjusted to be axially parallel to the lower wheel or at a slight angle in either direction from the vertical plane through the axis of the lower wheel. Independent adjustment of either end of the axle 65 allows the saw filer to so place the upper wheel that only an axial point at one end of the axle lies in said vertical plane, or the point of coincidence may be anywhere else along the axle 65, or the axis may be entirely outside of said plane at either side thereof.

The yoke 68 is pinned to the end of the axle 65 by a vertically disposed pivot member such as bolt 69 which passes through the upper and lower arms of the yoke and a bore hole through the axle at right angles to the upper and lower flat surfaces of the end thereof, the bolt being held in position by a nut 70 slotted for a cotter key (not shown). The yoke is elongated in the direction normal to the axle and lies substantially horizontal. The horizontally elongated slot 67 in the yoke permits angular shifting of the axle 65 in a horizontal plane relative to the longitudinal axis of the yoke. The rear end of the yoke is cylindrical and is slidably guided in a rearward split bearing assembly 71 mounted in a yoke cradle 72 at the rear end thereof. The forward end of the yoke is cylindrical and is journaled in an externally threaded sleeve 73 which is provided with capstan recesses 74. The outer end of the sleeve 73 is flush with the end of the yoke and is engaged by a cap plate 75 fixed to the end of the yoke by bolts 76. The external threads of the sleeve 73 are engaged by the internally threaded halves of a forward split bearing assembly 77 which is fixedly mounted in the forward end of the yoke cradle 72. A capstan wrench may be engaged within the recesses 74 to rotate the sleeve 73, thereby shifting the yoke longitudinally in the cradle to effect crossline adjustments.

The yoke cradle 72 is provided at its ends with a pair of laterally spaced arms 80 which extend rearwardly in parallel relation to the yoke 68 on either side of a prolongation thereof, and which embrace a block 81 which journals a horizontal pivot 82 fixed to the two arms. The pivot 82 is substantially parallel to the axle 65. By reason of this construction the forward end of the cradle 72 may swing vertically about the axis of pivot 82. The cradle is provided with a slotted limiting projection 83 at its forward end, in the slot of which there is engaged a limiting bolt 84 fixed to a crosspiece 85 welded into the frame 32. The bolt 84 guides the forward end of the yoke cradle 72 for limited swinging movement in a vertical manner about the axis of the pivot 82.

The block 81 is fixed to a downwardly projecting, vertical pivot 86 which extends through a thrust bearing 87 supporting the block 81 and through a vertically disposed sleeve 88 welded into the frame 32 at its upper rear corner. The sleeve 88 supports the thrust bearing 87 and a nut 89 engages the lower threaded end of the pivot 86 to retain the pivot in the sleeve. The nut is slotted for reception of a cotter pin (not shown) whereby the yoke assembly is removably retained in position. The slot in the limiting projection 83 is considerably wider than the diameter of the limiting bolt 84 whereby the yoke cradle 72 is permitted limited arcuate movement horizontally about the axis of the pivot 86.

It can be seen that shifting one of the threaded sleeves 73 while the other remains stationary results in foreshortening the distance between the two upper band wheel pivot members 69, which is allowed by horizontal swinging of the yoke cradles 72 about the vertical pivots 86. Shifting of one of the frames 32 vertically with respect to the other to adjust the angle of tilt is permitted by reason of the yokes 68 being journaled at their longitudinal ends, and by reason of the horizontal pivoting of the yoke cradles 72 about the vertical pivots 86. However, changing the angle of tilt cannot adversely affect the crossline angle adjustment means, nor can changing of the crossline angle adversely affect the angle of tilt adjustment means, by reason of the yoke and cradle construction thus described.

A pair of vertically extending strain rods 95 are provided, one being mounted in each of the frames 32, the upper ends of the strain rods bearing respectively against the lower forward ends of the yoke cradles 72 in forwardly spaced relation to the axle pivot members 69, and the lower ends of the strain rods bearing against a torque bar 96 as will appear. Each end of the strain rod is conically tapered and is provided with a coaxially disposed conical recess 97 in which is retained a thrust ball 98. The ball is retained by a pair of clips 99 fastened to the conical external surface of the rod end by screws 100, there being two clips at each end, the clips being narrow, and being diametrically opposed to each other. Each strain rod has a laterally projecting plate 101 welded thereto, the outer edge of which lies closely alongside a machined inner surface of a portion of the frame 32 to prevent rotation of the strain rod, whereby the clips 99 are maintained in such positions that they cannot engage portions of the torque bar. The strain rod is thereby prevented from rotating, but may freely rise and fall within the frame 32 as influenced by the torque bar.

The upper thrust ball 98 of each strain rod is received in a conical recess in a hardened ball seat 102 facing downwardly at the forward end of the yoke cradle 72 (FIG. 5). The lower thrust ball of each strain rod is received in a conical recess in a hardened ball seat 103 mounted in an end of the torque bar 96. The ball seat 103 faces upwardly from a flattened surface 104 of a relieved portion 105 of the end of the torque bar, the ball being normally retained with its center horizontally forward of the axis of the torque bar 96.

The ends of the torque bar 96 project into the respective frames 32 through openings 107 in a wall of the frame. Each end of the torque bar rests upon a thrust ball 108 retained by clips similar to clips 99 in a conical recess in the upper end of a torque bar support 109 projecting upwardly from a crosspiece 110 of the 32. The support 109 is retained in vertical, non-rotating position by a pair of ears 111 welded to the crosspiece 110 and engaging flat surfaces of the support 109, by the flat lower end of the support 109 engaging the upper surface of the crosspiece 110, and by a bolt 112 passing through the ears 111 and the support 109. The ball 108 is seated in a conical recess of a hardened ball seat 113 which faces downwardly from a flattened surface 114 provided in a relieved portion 115 of the end of the torque bar 96. The arrangement is such that the center of the ball 108 lies normally in a horizontal plane passing through the axis of the torque bar and the center of the ball 98, the balls 98 and 108 being equidistantly spaced on opposite sides of the axis of the torque bar with their centers in a vertical plane normal to the axis of the torque bar.

Adjacent the off-bear frame 32 the torque bar 96 is provided with a keyway slot 117 in which is mounted a key 118 keying a counterbalance arm 119 to the torque bar, the arm 119 comprising a strap encircling the cylindrical torque bar, and in which there is a key-receiving recess. The counterbalance arm 119 extends rearwardly and supports a horizontal pin 120 at one end. The other end of pin 120 is supported in a second counterbalance arm 121 which extends horizontally and parallel to the first arm 119, the counterbalance arm 121 having a strap end journaled on but not keyed to the torque bar. The pin 120 pivotally supports a depending weight rod 122 on which a plurality of weights 123 are mounted, the weights being removable for adjustment purposes.

It can be seen from the foregoing that the torque bar is floatingly supported in the frames 32 in such manner that it may tilt to permit vertical adjustment of one frame with respect to the other, in such manner that it may twist to accommodate strains imposed on the strain rods 95 by reason of strains on the band saw, and in such manner that a greater amount of twist unaffected by the counterbalance weight is provided for the sawyer's end of the torque bar than for the off-bear end thereof. Also it can be seen that any change in the angle of tilt or the crossline angle will not adversely affect the strain rod assembly by reason of the ball and ball seat mounting thereof.

A scraper blade 125 is journaled on the torsion bar 96 between the two arms 119 and 121, being retained in a central position by set collars 126 on the torsion bar. A lever 127, extending rearwardly from the cylindrical sleeve 128 which journals the blade on the bar, supports an adjustable weight 129. The blade bears against the surface of the upper band wheel to scrape off sawdust or other material which might otherwise become lodged on the band-engaging surface of the upper wheel.

A reduction gear motor 130 is mounted on the off-bear frame 32. The motor drives a shaft 131, journaled in gimbal bearings 136 mounted on the frames 32, through a sprocket chain and gear drive assembly 132. A pair of sprocket gears 133 fixed to shaft 131 respectively engage vertically extending flights of sprocket chains 134, the upper portions of which are engaged around idler sprocket gears 135 at the tops of the frames 32. The forward edge of each frame 32 comprises a vertically extending T-shaped guide 137 upon which are mounted slides 138 guided for vertical movement thereby. Each slide has a pivot 139 thereon lying horizontally and extending normal to the axes of the wheels. Links 140 depending from the pivots 139 support horizontal aligned pivots 141 between which extends a blade guide assembly 142 provided with suitable pads for engaging the inner surface of the band above the cutting zone to dampen vibrations thereof. Also, a lower blade guide assembly 143 is mounted on the frame 10 in position to engage a lower portion of the outer surface of the band beneath the cutting zone. The upper and lower forward portions of the sprocket chains 134 are attached to the slides 138. The motor 130 is under control of the sawyer whereby he may adjust the vertical spacing between the upper and lower band guides at any time.

It is to be appreciated that a preferred embodiment of the present invention has been illustrated and described, and that modifications in detail and arrangement thereof would be readily perceived by those skilled in the art. All such modifications as come within the scope of the following claims are considered to be a part of my invention.

I claim:

1. A band mill comprising a base, a lower band wheel mounted upon said base, supporting means mounted upon said base and extending upwardly therefrom, said supporting means including a pair of guide means extending vertically in parallel relation to each other, spaced apart in the axial direction of said lower band wheel and on opposite sides thereof, a pair of frames respectively mounted on said guide means for vertical sliding movement toward and away from said base, an upper band wheel, means journaling said upper band wheel on and between said frames substantially in vertical alignment with said lower band wheel, with the axes of said wheels substantially parallel and lying substantially in a vertical plane, and means to raise or lower one of said frames independently of the other to effect tilt adjustment of said upper band wheel, said means journaling said upper band wheel comprising a band wheel axle, a pair of vertically extending band wheel axle pivot members respectively mounted on said frames, said pivot members passing respectively through the ends of said axle to prevent rotation thereof while permitting angular horizontal shifting of said axle whereby crossline adjustment of said upper band wheel may be effected, and means for shifting either of said pivot members bodily in a direction substantially normal to said vertical plane whereby to effect said crossline adjustment.

2. A band mill comprising a base, a lower band wheel mounted upon said base, supporting means mounted upon said base and extending upwardly therefrom, said supporting means including a pair of guide means extending vertically in parallel relation to each other, spaced apart in the axial direction of said lower band wheel and on opposite sides thereof, a pair of frames respectively mounted on said guide means for vertical sliding movement toward and away from said base, an upper band wheel, means journaling said upper band wheel on and between said frames substantially in vertical alignment with said lower band wheel, with the axes of said wheels substantially parallel and lying substantially in a vertical plane, means to raise or lower one of said frames independently of the other to effect tilt adjustment of said upper band wheel, said means journaling said upper band wheel comprising a band wheel axle, a pair of vertically extending band wheel axle pivot members, and means respectively mounting said pivot members on said frames, said pivot members passing respectively through the ends of said axle at right angles thereto to prevent rotation thereof while permitting angular horizontal shifting of said axle whereby crossline adjustment of said upper band wheel may be effected, said pivot member mounting means comprising means for bodily displacing said pivot members horizontally in a direction normal to said axle to effect said crossline adjustment, and said pivot member mounting means including means permitting angular shifting of said pivot member in a vertical plane, bodily displacement of said pivot members vertically and bodily displacement of said pivot members horizontally in the direction of said axle to permit said adjustments.

3. A band mill comprising a base, a lower band wheel mounted on said base, supporting means mounted upon said base and extending upwardly therefrom, said supporting means including a pair of guide means extending vertically in parallel relation to each other, spaced apart in the axial direction of said lower band wheel and on opposite sides thereof, a pair of frames respectively mounted on said guide means for vertical sliding movement toward and away from said base, an upper band wheel, a band saw trained about said wheels, means journaling said upper band wheel on and between said frames substantially in vertical alignment with said lower band wheel with the axes of said wheels substantially parallel and lying substantially in a vertical plane, a pair of jack means mounted on said base and respectively supporting said frames, means to extend or contract said jack means coextensively and simultaneously, means to extend or contract one of said jack means independently of the other to effect tilt adjustment of said upper band wheel, said means journaling said upper band wheel comprising a band wheel axle, a pair of vertically extending band wheel axle pivot members respectively mounted on said frames, said pivot members passing respectively through the ends of said axle to prevent rotation thereof while permitting angular shifting of said axle in a horizontal direction whereby crossline adjustment of said upper band wheel may be effected, means for shifting either of said pivot members bodily in a horizontal direction substantially normal to said vertical plane and substantially horizontally whereby to effect said crossline adjustment, means mounting each of said pivot members respectively comprising a cradle, a yoke embracing the end of the axle and supporting said pivot member, said yoke extending horizontally and normal to said axle, means mounting said yoke on said cradle for angular displacement about its own axis and bodily displacement longitudinally, and pivot means respectively mounting said cradles on said frames for limited angular displacement vertically and horizontally, and strain relief means comprising a torque bar and a pair of vertically disposed strain rods respectively supporting said cradles to limit vertical angular displacement thereof to that imposed by strain on said band saw during use of the band mill, the upper end of each strain rod and a portion of each of said cradles comprising ball and socket means respectively disposed outwardly from the pivotal mounting of said cradle with respect to said pivot means, the lower end of each strain rod and said torque bar comprising other ball and socket means, and third ball and socket means supporting the ends of said torque bar respectively on said frames with the torque bar extending substantially parallel to the axes of said wheels.

4. In a band mill having vertically aligned lower and upper band wheels about which a band saw is trained, the improvement in means for mounting said upper band wheel comprising a frame, a non-rotatable axle, means rotatably mounting said upper band wheel on said axle, and means mounting an end of said axle upon said frame comprising a horizontally disposed, elongated yoke embracing said end of the axle and extending in a direction normal to the axis of the axle, vertically disposed pivot means pinning said end of the axle to said yoke for permitting relative angular shifting of said axle and yoke in a horizontal direction, a cradle supporting said yoke, said cradle comprising means journaling said yoke for longitudinal shifting of said axle and yoke and angular displacement thereof about its own axis, and means pivotally mounting said cradle upon said frame for limited movement both horizontally and vertically.

5. In a band mill having vertically aligned lower and upper band wheels about which a band saw is trained, the improvement in means for mounting said upper band wheel comprising a frame, a non-rotatable axle, means rotatably mounting said upper band wheel on said axle, and means mounting an end of said axle upon said frame comprising a horizontally disposed, elongated yoke embracing said end of the axle and extending in a direction normal to the axis of the axle, vertically disposed pivot means pinning said end of the axle to said yoke for permitting relative angular shifting of said axle and yoke in a horizontal direction, a cradle supporting said yoke, said cradle comprising means journaling said yoke for longitudinal shifting thereof and angular displacement thereof about its own axis, means pivotally mounting said cradle upon said frame for limited movement both horizontally and vertically, and a strain rod assembly mounted in said frame and yieldably resisting downward pivoting movement of said cradle, said strain rod assembly comprising a vertically disposed strain rod and ball and socket means at each end thereof.

6. In a band mill,
a pair of cradles,
a base,
a lower band wheel mounted on the base,
an upper band wheel,
a pair of frames individually adjustable vertically relative to the base,
a pair of cradles,
means universally connecting the cradles to the frames for horizontally and vertical movement relative thereto,
a pair of elongated yokes mounted in the cradles in positions extending generally horizontally,
an axle supporting the upper wheel rotatably,
a pair of pivot members connecting the ends of the axle to the yokes for horizontal pivotal movement of the axle relative to the yokes,
means mounting the yokes on the cradles for bodily movement in a direction transverse to the axis of the axle and for rotation of the yokes about the longitudinal axes of the yokes.
and means for individually adjusting the yokes in a direction transverse to the axis of the axle to effect crossline adjustment of the upper wheel.

7. In a band mill,
an upper wheel,
axle means mounting the upper wheel rotatably thereon,
a pair of elongated cradles,
means mounting the ends of the axle means universally pivotally on the cradles in a position extending generally transversely to the cradles,
means for adjusting the means mounting the ends of the axle relative to the cradles in a direction transverse to the longitudinal axis of the axle,
a pair of frames adjustable vertically relative to one another,
means mounting one end of each of the cradles on the frames for universal pivotal movement relative thereto,
and a pair of strain rods supporting the other ends of the cradles resiliently.

References Cited in the file of this patent
UNITED STATES PATENTS

| | | |
|---|---|---|
| 416,012 | Prescott | Nov. 26, 1889 |
| 478,817 | Prescott | July 12, 1892 |
| 771,064 | Hanhart | Sept. 27, 1904 |
| 879,500 | Stevens | Feb. 18, 1908 |
| 919,128 | Cleveland | Apr. 20, 1909 |
| 1,486,632 | Campbell | Mar. 11, 1924 |
| 1,567,911 | Campbell | Dec. 29, 1925 |
| 2,134,500 | Bennett | Oct. 25, 1938 |
| 2,307,190 | Bell | Jan. 5, 1943 |
| 2,664,118 | Krumbach | Dec. 29, 1953 |

FOREIGN PATENTS

| | | |
|---|---|---|
| 1,185,115 | France | Feb. 9, 1959 |

UNITED STATES PATENT OFFICE
CERTIFICATE OF CORRECTION

Patent No. 3,158,184                      November 24, 1964

Milton H. Mater

It is hereby certified that error appears in the above numbered patent requiring correction and that the said Letters Patent should read as corrected below.

Column 4, line 66, for "within" read -- with --; column 5, line 72, after "of the" insert -- frame --; column 9, line 5, strike out "a pair of cradles,"; line 13, for "horizontally" read -- horizontal --; same column 9, line 24, for "yokes." read -- yokes, --.

Signed and sealed this 20th day of April 1965.

(SEAL)
Attest:

ERNEST W. SWIDER
Attesting Officer

EDWARD J. BRENNER
Commissioner of Patents